Oct. 30, 1962 A. E. DIBERT 3,060,920
MOBILE BARBECUE
Filed Nov. 12, 1958 3 Sheets-Sheet 1
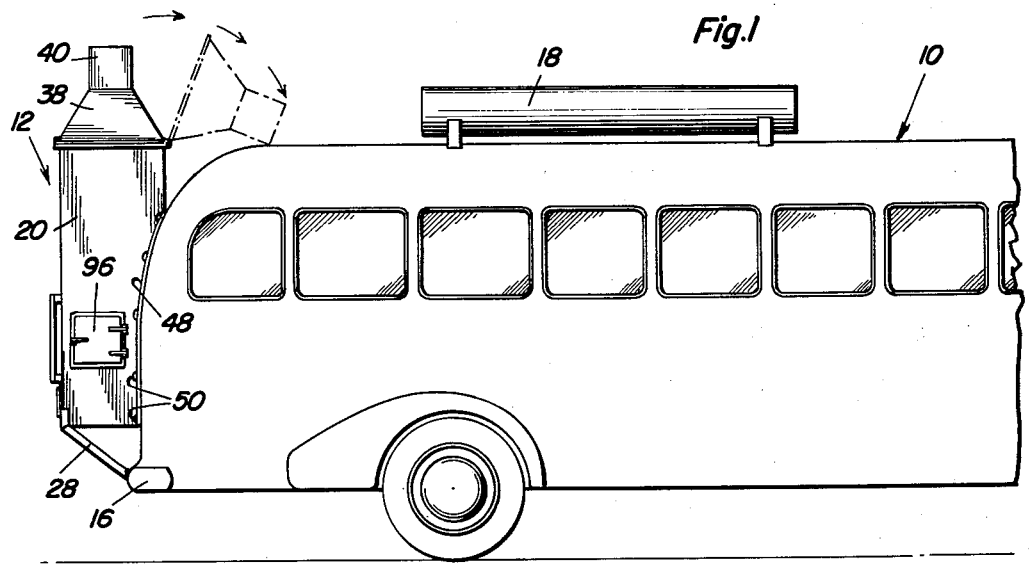
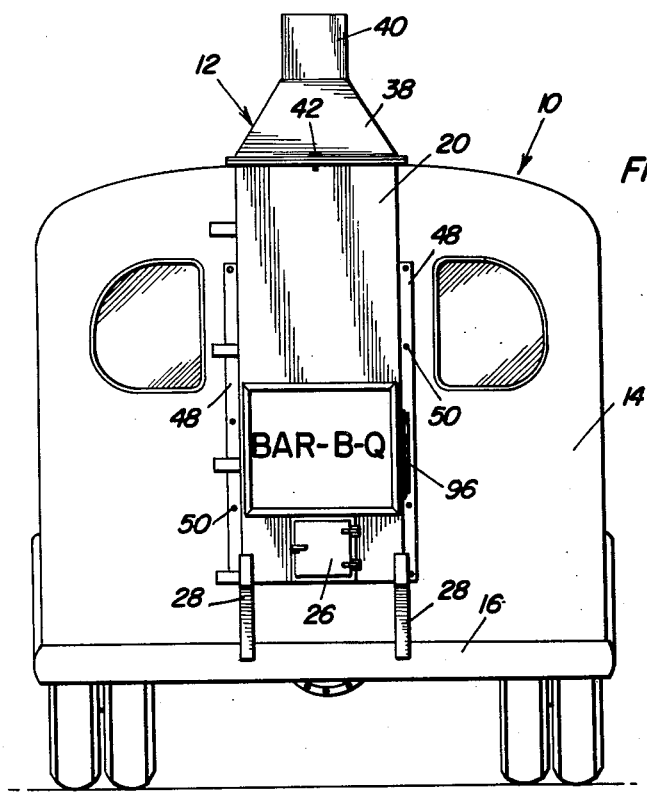
Americus E. Dibert
INVENTOR.

Oct. 30, 1962    A. E. DIBERT    3,060,920
MOBILE BARBECUE
Filed Nov. 12, 1958    3 Sheets-Sheet 2
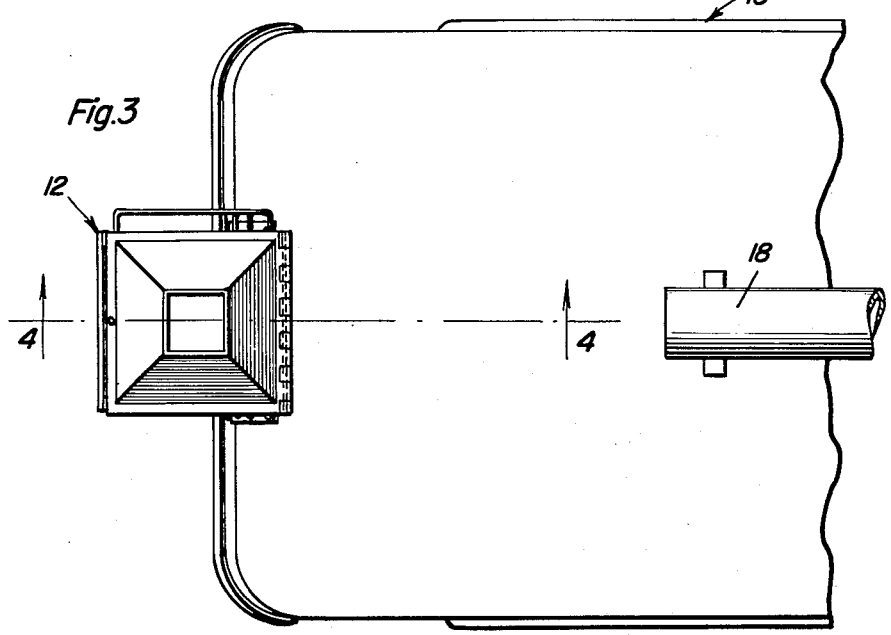
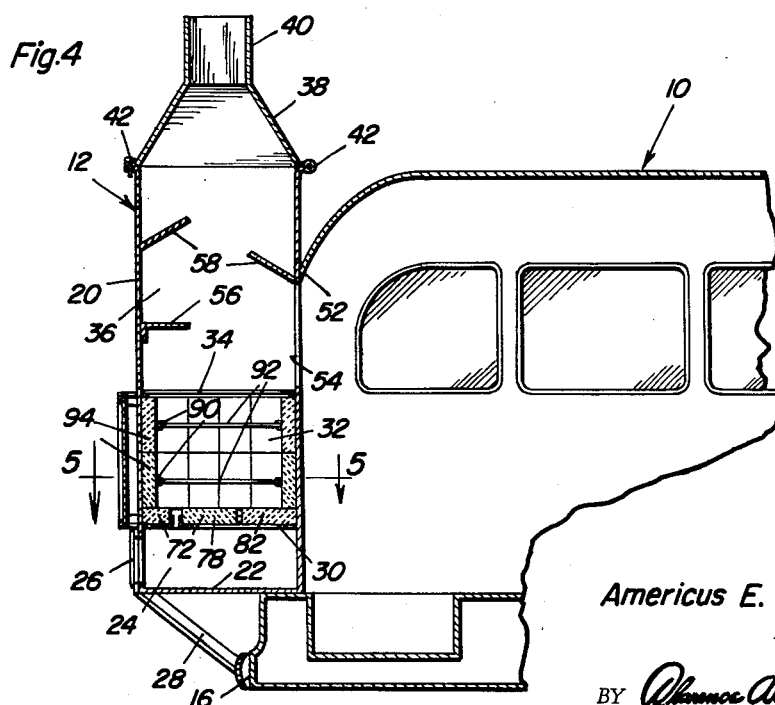
Americus E. Dibert
INVENTOR.

Oct. 30, 1962     A. E. DIBERT     3,060,920
MOBILE BARBECUE
Filed Nov. 12, 1958     3 Sheets-Sheet 3
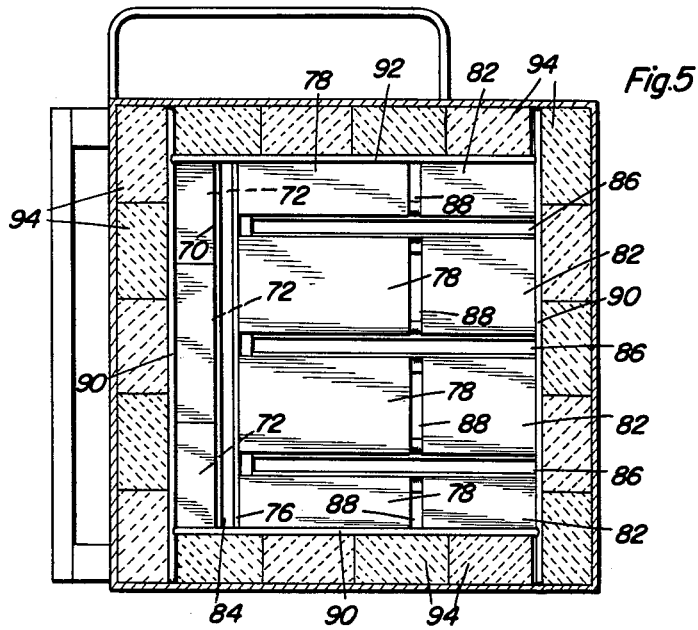
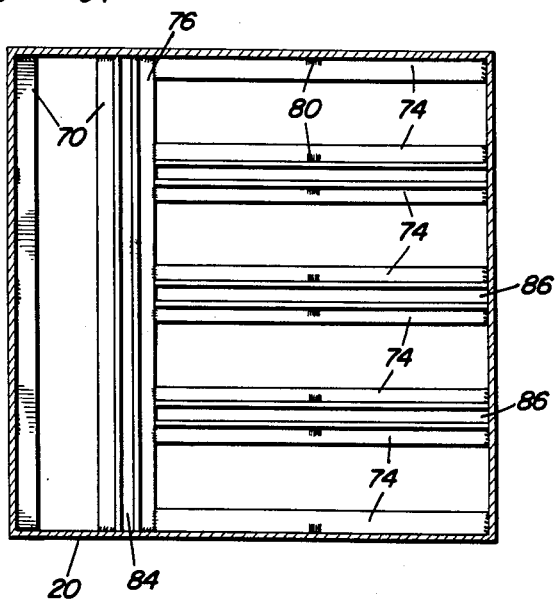
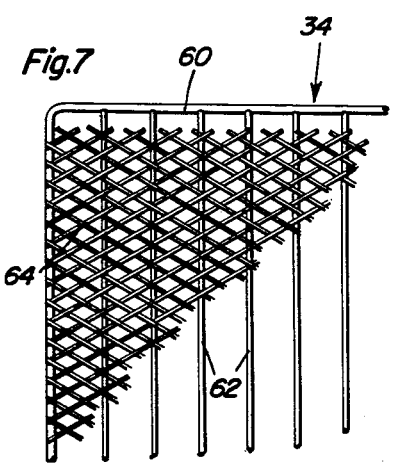
Americus E. Dibert
INVENTOR.

United States Patent Office 3,060,920
Patented Oct. 30, 1962

3,060,920
MOBILE BARBECUE
Americus E. Dibert, R.D. 4, Bedford, Pa.
Filed Nov. 12, 1958, Ser. No. 773,204
3 Claims. (Cl. 126—276)

This invention comprises a novel and useful mobile barbecue and more particularly relates to an improved construction of a barbecue which is specifically adapted for detachable mounting upon a bus, trailer, or any other vehicle.

The principal object of this invention is to provide a barbecue specifically adapted to be mounted upon and cooperate with the rear portion of a bus or the like whereby the barbecue is rendered mobile, is accessible from the interior of the bus and may be employed to serve the occupants of a bus.

A further object of the invention is to provide a mobile barbecue in accordance with the preceding objects wherein the top hood and chimney thereof may be hinged for pivotal movement about a horizontal axis whereby to reduce the overall height of the device as well as to provide access to the fire compartment and oven to facilitate cleaning thereof.

A further object of the invention is to provide a barbecue apparatus which shall be capable of detachable mounting upon a vehicle thereby enabling the device to be easily installed or removed therefrom.

A further object of the invention is to provide a barbecue having a novel support for the ready insertion and removal of fire bricks for lining the fire chamber of the barbecue.

Yet another object of this invention is to provide a barbecue having a novel support structure for the bricks forming the bottom wall of the fire chamber and wherein spacing is provided between the bricks to enable the latter to act as grates and to allow air and ashes to pass therethrough.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a side elevational view showing a preferred form of barbecue in accordance with this invention detachably secured to the rear end of a bus, the hood and chimney of the barbecue being shown in operating position in full lines therein, and being shown in dotted lines in a tilted position;

FIGURE 2 is a rear elevational view of the bus showing the manner in which the barbecue device of this invention is detachably secured upon the bus and specifically in the emergency rear door opening of the bus;

FIGURE 3 is a fragmentary top plan view of the bus showing the disposition of the barbecue relative thereto;

FIGURE 4 is a vertical central longitudinal sectional view taken substantially upon the plane indicated by the section line 4—4 of FIGURE 3 and showing certain details of the interior of the barbecue, of its communication with the interior of the bus and of the mounting of the barbecue upon the bus;

FIGURE 5 is a view in horizontal section taken substantially upon a plane indicated by the section line 5—5 of FIGURE 4 upon an enlarged scale and showing the bottom wall of the fire chamber of the barbecue;

FIGURE 6 is a plan view of the bottom of the fire chamber of the barbecue with the fire bricks being removed therefrom in order to disclose the support members for the bottom wall fire bricks; and FIGURE 7 is a fragmentary plan view of a portion of the grill which is mounted upon the top of the fire chamber of the barbecue.

Referring now more specifically to the accompanying drawings, wherein like numerals designate similar parts throughout the various views, it will be observed that the numeral 10 designates a bus of any desired character while the numeral 12 indicates in its entirety the barbecue apparatus of this invention as mounted detachably upon the bus.

The bus has a rear end wall 14 which as shown best in FIGURE 1 is rounded at its upper portion to merge into the roof of the bus, and at the bottom end of this rear wall the body of the bus is provided with a rearwardly projecting ledge 16. There may be conveniently mounted upon the top of the bus a water tank as at 18 and the bus may be provided with chairs, tables or the like in the interior thereof if desired, it being unnecessary to illustrate these elements for an understanding of the principles of this invention.

Referring now especially to FIGURE 4 it will be observed that the barbecue apparatus 12 consists of a metallic housing 20 which may be conveniently formed of metal plate, being generally square in cross-section. The housing is provided with a bottom wall 22 immediately above which is disposed a chamber 24 comprising an ashpit and having a door 26 for cleaning the interior of the same. Suitable braces 28, see FIGURE 2 in conjunction with FIGURE 4, have their lower ends secured to the rearwardly projecting ledge 16 of the bus body, and have their upper ends secured to the rearward lower edges of the housing 20 to assist in supporting the latter upon the bus.

Above the ashpit the interior of the housing 20 is provided with a horizontal partition 30 of a grate-like character as set forth hereinafter, and this devides the ashpit 24 from a fire chamber 32. At the top of the fire chamber there is provided a horizontally or a transversely extending screen or grid 34 which divides the fire chamber from an oven 36 which comprises the uppermost chamber in the housing.

The open upper end of the housing is provided with an upwardly convergent sheet metal funnel shaped body 38 which comprises a hood for the barbecue, the same terminating in an upstanding centrally disposed chimney 40. The hood is preferably hinged as at 42 to the upper forward wall of the housing 20 for tilting movement about the horizontal axis of the pivot 42, while suitable fasteners such as bolts 44 may be provided for clamping the hood upon the housing. The arrangement is such that as shown in FIGURE 1 the hood and chimney may be secured in vertical alignment with the housing 20 to provide a chimney for the barbecue, or alternatively when the fastenings 42 have been released, may be hinged forwardly as shown in dotted lines in FIGURE 1 to rest upon the top of the bus, thereby registering the overall height of the barbecue as well as providing access to the interior of the housing 20 for cleaning or servicing or inspecting the same.

Although in FIGURE 1 for convenience of illustration the chimney 40 has been shown as terminating below the uppermost portion of the folded position of the hood shown in the dotted lines therein, it will be understood that the chimney 40 will preferably in normal operation extend considerably above this position.

Referring now especially to FIGURE 2 it will be observed that the side walls of the housing 20 at their edges adjacent to the rear wall 14 of the bus are provided with vertically extending laterally projecting flanges 48 which as shown in FIGURE 1 are contoured to fit the curved surface 14 of the bus and which are detachably secured to the latter as by fastening bolts 50 or the like. These fastening bolts in conjunction with the braces 20 serve to mount the barbecue apparatus 12 upon the rear or end wall of the bus in a readily detachable manner enabling the apparatus to be readily transferred from one bus to another as desired.

Referring next more specifically to FIGURE 4 it will be observed that the barbecue apparatus is fitted on the rear wall 14 of the bus adjacent the emergency rear door opening 52 thereof. The barbecue is provided with an opening 54 which registers with this opening in the bus and thereby permits access to the interior of the oven from the interior of the bus. Thus, the chef can, while standing in the interior of the bus employ the facilities of the barbecue.

Disposed above the grill 34 in the oven 36 is a horizontally extending warming shelf 56 enabling food to be placed thereon for warming over the fire chamber of the barbecue.

A series of staggered upwardly inclined baffles 58 may be secured to opposite side walls of the oven 36 to provide a smoke baffle preventing the wind from blowing smoke downwardly through the chimney 40 into the interior of the bus 10 through the openings 52 and 54.

Referring now to FIGURE 7 it will be observed that the grid 34 consists of a square or rectangular frame of rod or the like as at 60 having transverse bars 62 thereacross to provide a grill, there being provided a mesh screen as at 64 to enable steaks and hamburgers to be cooked directly upon the grill.

Attention is now directed to FIGURES 5 and 6 for an understanding of the manner in which the bottom walls of the fire chamber are lined with fire bricks. The bottom support 30 preferably comprises a plurality of flanged or angle iron members extending horizontally of the housing 20 and secured thereto. Thus, conveniently there is provided a pair of members as at 70 which extend entirely across the fire chamber from side to side thereof at the back wall of the fire chamber. The horizontal bottom flanges of these angle iron members thus provide a support in which a row of fire bricks as at 72 may be detachably secured and held in place, and sets of other angle iron members as at 74 are secured at one end to the front wall of the fire chamber adjacent the body of the bus and at their other end are secured to a further angle iron member 76 disposed in closely spaced parallel relation to the previously mentioned angle iron members 70. The sets of angle iron members 74 thus provide means to receive and support four rows of fire bricks as at 78. On the angle iron members 74 there are provided lugs as at 80 providing spaces whereby the adjacent ends of the fire bricks 78 and a second set of fire bricks as at 82 are spaced from each other.

Referring specifically to FIGURE 5 it will be observed that there are provided spaces between the fire bricks forming the bottom wall of the fire chamber, and there thus being provided a space as at 84 lying between the angle iron members 70 and 76; similarly spaces 86 lying between the sets of angle iron members 74, and further spaces as at 88 lying between the adjacent ends of the bottom fire bricks 78 and 82. These spaces provide means for the passage of air upwardly from the ashpit to the fire chamber for supporting combustion, and also provide spaces whereby ashes may sift downwardly from the fire chamber into the ashpit.

Still further, these spaces provide means for and facilitate the ready removal of the bottom layer of fire bricks when it is desired to replace or service the same.

A further series of support members are disposed in spaced adjacent relation to the side walls of the fire chamber above the bottom wall thereof for retaining in position therein the rear front and side walls of the fire bricks which line the fire chamber.

For this purpose there are provided vertically spaced series of support frames, each frame comprising a pair of rods as at 90 which are welded or otherwise rigidly secured to the two side walls of the housing 20, together with a pair of cross rods 92 each of which has its ends welded or rigidly secured to the pair of rods 90. The rods 90 and 92 are spaced inwardly of the fire chamber from the walls of the housing 20 by a sufficient distance to receive a plurality of fire bricks as at 94 therebetween. It will be understood that one of these support frames is provided for each course of the fire bricks, as will be best seen from FIGURE 4.

By this arrangement the side lining can be readily removed by merely lifting up the upper course of fire bricks and removing the same from the space in which the bricks are confined between the side walls of the housing 20 and the rods 90 or 92. After the side lining has been removed, the bottom lining of the fire chamber may likewise be removed. Thus, it is possible to readily service or repair the fire chamber as desired without difficulty.

A door 96 is provided in one side wall of the housing to provide access to and constitute a fire door for the fire chamber.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination of a motor vehicle body having a rear outside wall provided with an opening, and a barbecue comprising a vertically elongated housing disposed entirely exteriorly of said body and secured to said wall, said housing having an oven and a fire box below said oven provided therein, said oven having a lateral opening in register with said opening in the vehicle body wall, whereby access to the oven may be had through the registered openings from the interior of the vehicle body, said fire box including a set of spaced elongated horizontal support members provided in said housing below the oven, a bottom lining of fire bricks positioned on said support members in spaced relation whereby ashes may drop from the fire box, a plurality of vertically spaced sets of horizontal retaining rods provided in the housing in spaced parallel relation to the sides thereof and above the bottom lining, and a multiple course side lining of fire bricks positioned in the spaces between the rods and the sides of the housing with a set of rods engaging each course of side lining bricks to prevent dislodgement thereof during over-the-road movement of the vehicle body, the space between the rods and the sides of the housing being open at the top to enable replacement and removal of the side lining bricks.

2. The combination as defined in claim 1 wherein said housing is provided with an ash pit below said fire box, said ash pit having a door accessible from the exterior of said vehicle body.

3. The combination of a motor vehicle body including a roof and a rear outside wall provided with an opening, and a barbecue comprising a vertically elongated housing disposed entirely exteriorly of said outside wall, said housing having front and rear walls and being provided in its intermediate portion with an oven having a lateral opening in the front wall of the housing in register with the first mentioned opening whereby access to the oven may be had from the interior of said vehicle body, mounting flanges provided on the front wall of said housing and securing the same to said outside wall, a fire box provided in said housing below said oven, a grill in said housing between said oven and said fire box substantially at the level of the lower edge of said openings, and an ashpit provided in the lower end portion of the housing below said fire box and having a door in the rear wall of the housing accessible from the exterior of said vehicle body, the upper end of said housing being substantially flush with said roof, a set of spaced elongated horizontal support members provided in said housing above said ashpit, a bottom lining of fire bricks positioned on said support members with spaces between said bricks whereby ashes may drop from the fire box into said ashpit, a plurality of vertically spaced sets of horizontal retaining rods provided in the housing in spaced parallel relation to the sides thereof between said bottom lining and said grill, and a multiple course side lining of fire bricks positioned in the spaces between said rods and said sides of the housing with a set of rods engaging each course of side lining bricks to prevent dislodgement thereof during over the road movement of the vehicle body, the space between the rods and sides of the housing being open at the top to enable the placement and removal of the side lining bricks.

References Cited in the file of this patent

UNITED STATES PATENTS

| | | |
|---|---|---|
| 111,963 | Minniss | Feb. 21, 1871 |
| 182,999 | Gwynn | Oct. 10, 1876 |
| 239,257 | Kerper | Mar. 22, 1881 |
| 489,893 | Buckley | Jan. 10, 1893 |
| 512,273 | Brown | Jan. 9, 1894 |
| 702,999 | Richards | June 24, 1902 |
| 731,333 | Barker | June 16, 1903 |
| 780,265 | Closson | Jan. 17, 1905 |
| 791,890 | Fletcher | June 6, 1905 |
| 820,173 | Bender | May 8, 1906 |
| 981,608 | Beyer | Jan. 17, 1911 |
| 1,238,663 | Greiner | Aug. 28, 1917 |
| 1,328,071 | Baldwin | Jan. 13, 1920 |
| 1,567,000 | Thompson | Dec. 22, 1925 |
| 1,640,371 | Pierson | Aug. 30, 1927 |
| 2,316,519 | Larabee | Apr. 13, 1943 |
| 2,350,948 | Walker | June 6, 1944 |
| 2,353,179 | Morris | July 11, 1944 |
| 2,666,426 | Pollard | Jan. 19, 1954 |
| 2,804,066 | McCutchen | Aug. 27, 1957 |
| 2,809,575 | Floyd | Oct. 15, 1957 |
| 2,867,471 | Coon | Jan. 6, 1959 |
| 2,915,960 | McClellan | Dec. 8, 1959 |
| 2,924,212 | Phillips et al. | Feb. 9, 1960 |

FOREIGN PATENTS

| | | |
|---|---|---|
| 636 | Great Britain | 1865 |
| 645,111 | Great Britain | Oct. 25, 1950 |

OTHER REFERENCES

Publication by "Autobody," page 127 of the October 1927 issue.